United States Patent
Mesters et al.

(10) Patent No.: US 10,110,522 B1
(45) Date of Patent: Oct. 23, 2018

(54) SETTING SHARING OPTIONS FOR FILES USING A MESSAGING CLIENT

(71) Applicant: Amazon Technologies, Inc., Seattle, WA (US)

(72) Inventors: Floor Mesters, The Hague (NL); Milo Oostergo, The Hague (NL); Ivo van Doorn, The Hague (NL)

(73) Assignee: Amazon Technologies, Inc., Seattle, WA (US)

( * ) Notice: Subject to any disclaimer, the term of this patent is extended or adjusted under 35 U.S.C. 154(b) by 127 days.

(21) Appl. No.: 14/570,850

(22) Filed: Dec. 15, 2014

(51) Int. Cl.
*G06F 3/048* (2013.01)
*H04L 12/58* (2006.01)
*G06F 3/0482* (2013.01)
*G06F 3/0484* (2013.01)

(52) U.S. Cl.
CPC .......... *H04L 51/046* (2013.01); *G06F 3/0482* (2013.01); *G06F 3/04842* (2013.01)

(58) Field of Classification Search
CPC ..................... H04L 65/403; H04L 65/4007
See application file for complete search history.

(56) References Cited

U.S. PATENT DOCUMENTS

| | | | |
|---|---|---|---|
| 6,766,321 B2 | 7/2004 | Sasaki et al. | |
| 6,826,595 B1 | 11/2004 | Barbash et al. | |
| 7,970,850 B1* | 6/2011 | Callanan | H04L 51/046 709/206 |
| 8,065,424 B2 | 11/2011 | Foresti et al. | |
| 2002/0065892 A1 | 5/2002 | Malik | |
| 2002/0198936 A1 | 12/2002 | McIntyre et al. | |
| 2003/0200268 A1 | 10/2003 | Morris | |
| 2004/0049696 A1* | 3/2004 | Baker | G06Q 10/107 726/1 |
| 2004/0186851 A1 | 9/2004 | Jhingan et al. | |
| 2005/0234864 A1* | 10/2005 | Shapiro | H04L 67/104 |
| 2005/0283461 A1 | 12/2005 | Sell et al. | |
| 2006/0053380 A1* | 3/2006 | Spataro | G06F 17/30011 715/753 |
| 2006/0265390 A1* | 11/2006 | Aldrich | G06Q 10/10 |

(Continued)

OTHER PUBLICATIONS

"Starting a PDF review, Adobe Acrobat—Adobe Support", taken from https://helpx.adobe.com/acrobat/using/starting-pdf-review.html, published Jun. 18, 2013, pp. 1-7.*

(Continued)

*Primary Examiner* — William Bashore
*Assistant Examiner* — Gregory A Distefano
(74) *Attorney, Agent, or Firm* — Lee & Hayes, PLLC

(57) ABSTRACT

Functionality is disclosed herein for setting sharing options for files using a messaging client. A message interface is displayed that allows a user to compose an electronic message. While the message is being composed, the user may specify sharing options for a file, or files, associated with the message. The sharing options may specify access settings used to identify the users that are allowed to access the file through a sharing service, feedback settings that are used to indicate when feedback is expected, and expiration settings that are used to indicate when sharing of the file expires. The sharing options are communicated from the messaging client to the sharing service. The sharing service may utilize the sharing options to control the manner in which the file, or files, is shared.

13 Claims, 12 Drawing Sheets

(56) References Cited

U.S. PATENT DOCUMENTS

| | | | |
|---|---|---|---|
| 2007/0067332 A1 | 3/2007 | Gallagher et al. | |
| 2007/0255792 A1* | 11/2007 | Gronberg | H04L 12/5835 709/206 |
| 2008/0077676 A1 | 3/2008 | Nagarajan et al. | |
| 2008/0098294 A1 | 4/2008 | Le | |
| 2009/0089378 A1* | 4/2009 | Maresh | G06Q 10/107 709/206 |
| 2009/0113002 A1* | 4/2009 | Zellner | G06Q 10/107 709/206 |
| 2010/0070594 A1 | 3/2010 | Yoshimura | |
| 2010/0082713 A1 | 4/2010 | Frid-Nielsen et al. | |
| 2010/0217818 A1 | 8/2010 | Wu | |
| 2010/0241711 A1* | 9/2010 | Ansari | G06Q 30/04 709/205 |
| 2010/0318893 A1 | 12/2010 | Matthews et al. | |
| 2011/0099154 A1 | 4/2011 | Maydew et al. | |
| 2012/0278405 A1 | 11/2012 | Costenaro et al. | |
| 2012/0284344 A1 | 11/2012 | Costenaro et al. | |
| 2013/0212112 A1 | 8/2013 | Blom et al. | |
| 2014/0068401 A1* | 3/2014 | Kirigin | G06F 17/30884 715/205 |
| 2014/0165176 A1* | 6/2014 | Ow | H04L 63/10 726/8 |
| 2014/0359085 A1* | 12/2014 | Chen | H04L 41/0803 709/220 |
| 2015/0095430 A1 | 4/2015 | Kaushik et al. | |
| 2015/0134751 A1* | 5/2015 | Meyers, Jr. | H04L 51/08 709/206 |
| 2015/0271117 A1* | 9/2015 | Massand | H04L 51/08 715/752 |
| 2015/0350134 A1* | 12/2015 | Yang | H04L 51/063 709/206 |

OTHER PUBLICATIONS

"Simplify Attachments with Box for Outlook", taken from https://blog.box.com/blog/simplify-attachments-with-box-for-outlook/, published Aug. 28, 2011, 2 pgs.*

Office action for U.S. Appl. No. 14/571,011, dated Jul. 7, 2017, Mesters, et. al., "Uploading Attachments to Sharing Service Using a Messaging Client ", 27 pages.

Office action for U.S. Appl. No. 14/571,011, dated Dec. 28, 2017, Mesters, et. al., "Uploading Attachments to Sharing Service Using a Messaging Client", 24 pages.

Office action for U.S. Appl. No. 14/571,139, dated Mar. 7, 2018, Mesters, "Managing Document Feedback on a Sharing Service Using a Messaging Client", 19 pages.

Office action for U.S. Appl. No. 14/571,139, dated Jul. 28, 2017, Mesters, "Managing Document Feedback on a Sharing Service Using a Messaging Client", 15 pages.

* cited by examiner

SHARING AND FEEDBACK OPTIONS

ACCESS TO FILE(S) — 505A

● ONLY ALLOW RECIPIENTS TO ACCESS FILES
○ ALLOW ALL PEOPLE OF ORGANIZATION TO ACCESS
○ ALLOW ANYONE TO ACCESS

REQUEST FEEDBACK BEFORE — 505B

○ NO DEADLINE   ● DEADLINE ON [06/02/2014] [05:30 PM]

EXPIRE LINK TO FILES IN DOCUMENT SHARING SERVICE — 505C

○ NO EXPIRATION
● EXPIRES ON [06/06/2014] [05:30 PM]

[OK]   [CANCEL]

MESSAGE 109

| Send | Save | Delete | Attach/Share |
|---|---|---|---|
| | | | 305A 305B 305C 305D |

From: Mike Smith  06/01/2014

To: Paul D., Frank M.

Documents that require your comment

Paul and Frank:
I would like to share files with you.

[Profile image.jpg]  1.1 MB  405A
- Access Restricted to Recipients
- Link Expires in 5 days
- Feedback Due in 24 hours   705A

[Finance.xls]  50KB  405B
- All Access
- Link Expires in 5 days   705B

Deleted
Drafts
Inbox
Junk e-mail
Outbox
RSS Feeds
Sent Items

SETTING SHARING OPTIONS FOR FILES USING A MESSAGING CLIENT

BACKGROUND

Many businesses and users depend on electronic mail ("email") for communication. These different users may rely on email to send messages and share files. A user might receive between twenty-five and two hundred emails a day and send between ten and eighty emails a day. In some cases, the user will add attachments to the emails before sending to another user. Some of these attachments may be relatively small in size (e.g., less than 1 MB) whereas other attachments may be relatively large (e.g., greater than 5 MB).

Managing all of this data can be very challenging both for the user and for the businesses. In the case of the user, controlling who has access to an attachment can be difficult and time consuming. For example, a user might encrypt emails or password protect attachments intended for particular recipients. Businesses, on the other hand, may be attempting to manage all of this data and the email service on their own premises ("on-premise"). For example, a business may deploy servers on-premise to provide the email service. Providing an on-promise email service, however, can be costly, not only due to upkeep of the computers but also in administrators to manage the email service.

BRIEF DESCRIPTION OF THE DRAWINGS

FIG. 5 is a screen diagram showing an illustrative graphical user interface that displays data relating to setting the sharing options for the message;

FIG. 7 is a screen diagram showing an illustrative graphical user interface that may be displayed after the sharing options are specified for the message;

DETAILED DESCRIPTION

Figure 1:
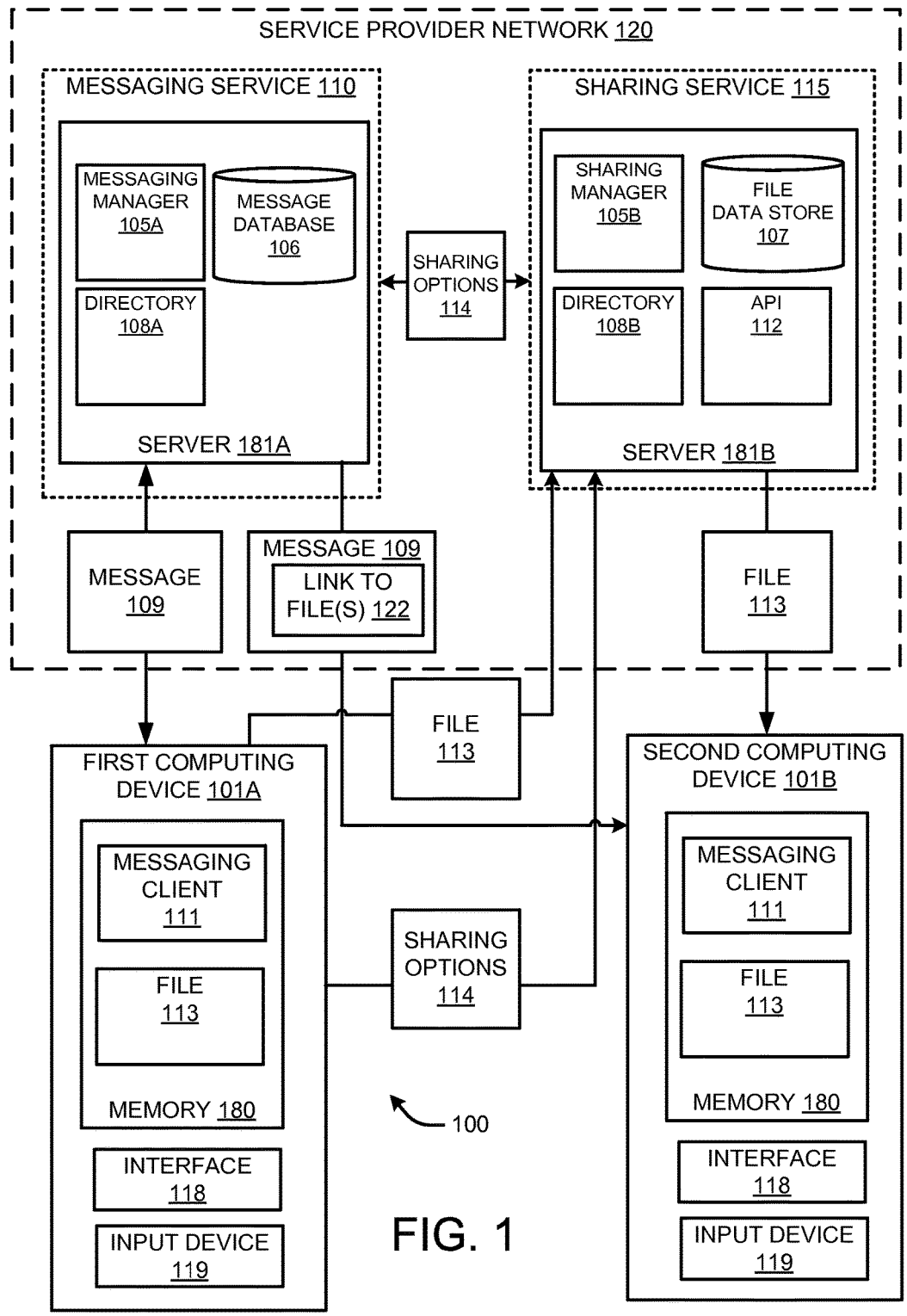
FIG. 1 is a block diagram depicting an illustrative framework in which sharing options for files accessible through a sharing service may be specified using a messaging client.

The following detailed description is directed to technologies for setting sharing options for files using a messaging client. Utilizing the technologies described herein, a user may specify the users that can access one or more shared files while composing an electronic message, such as an email. For example, a user may use a messaging client to specify the files to be shared as well as to set the permissions required to access the shared files using a sharing service. In some configurations, the files that are specified to be shared while composing the message are stored by a sharing service that is separate from the messaging service that is used to send the message to one or more recipients. The sharing service may provide access to the shared files to one or more users based on the sharing options set during composition of the electronic message. For instance, the sharing service may restrict or allow access to a file to a user based on the access settings specified by the user that sent the electronic message. The sharing service can also be referred to as a "collaboration service," since at least some embodiments of the sharing service can allow users to work together on a document. For example, users can exchange different versions of a document, while providing comments on the document.

The messaging client might display a user interface ("UI") that may be utilized by the user composing the message to set the sharing options. According to some configurations, the sharing options include access settings, feedback settings, and expiration settings. The access settings may be used to specify the users that may access the files specified to be shared in the message. For example, the access settings might include an option to allow only recipients of the electronic message to access the shared files stored by the sharing service and associated with the electronic message.

The access settings might also include an option to allow anyone that has access to the electronic message to access the shared files associated with the electronic message. The access settings might also allow the user to specify the users, such as a group of users (e.g., the people of an organization), that can access the shared files associated with the electronic message and stored by the sharing service. Other access settings that specify the users that can access the shared files might also be included in the UI. For example, an access setting that allows a user to specify access settings for each shared file on a per file and per user basis might be included within the UI.

The feedback settings may be used to specify whether feedback is desired for one or more of the shared files as well as a time the feedback is desired. The UI might display one or more settings that may be used to specify the time within which the feedback is desired. In some examples, the user may set a feedback deadline setting that specifies a date and time the feedback is due. The expiration settings may be used to specify whether access to the shared files is to expire. For example, the UI might display one or more settings that indicate that no expiration is to be associated with the sharing of the files or that sharing of the files should expire at a specified time.

The sharing options specified by the user composing the message may be transmitted from the messaging client to the sharing service. According to some configurations, the messaging client utilizes one or more network application programming interfaces ("APIs") to communicate the access settings, the feedback settings, and the expiration settings to the sharing service. In some cases, the messaging client might utilize the APIs to transmit the settings directly to the sharing service. In other cases, the messaging client might utilize the APIs to transmit the settings to a messaging service that transmits the settings to the sharing service.

The sharing service uses the received settings to manage the sharing of the specified files. For example, the access settings may be used by the sharing service to specify the users that are allowed access to the files that are shared by the message. The sharing service prevents unauthorized users from accessing the shared files. The feedback settings may be used by the sharing service to specify the time feedback is requested. In some cases, the sharing service, or some other service, might provide one or more reminders to the user regarding a feedback deadline. The sharing service may use the expiration settings to determine when the sharing of the files is to expire. For example, the expiration settings may specify that the users authorized to access the shared files from the sharing service for some period of time (e.g. a day, a week, or a month). Additional details regarding the various components and processes described above for setting sharing options for files from within a messaging client will be presented below with regard to FIGS. 1-12.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a block diagram depicting an illustrative framework 100 in which sharing options for files accessible through a sharing service may be specified using a messaging client. In some configurations, the framework 100 includes a messaging service 110 and a separate sharing service 115. In other configurations, a single service or more than two services might be utilized to provide the functionality described herein as being provided by the messaging service 110 and/or the sharing service 115. The messaging service 110 and the sharing service 115 may respectively manage the communication, sharing, and storage of messages and files between computing devices, such as a first computing device 101A and a second computing device 101B (also referred to herein generically and collectively as "computing devices 101").

For illustrative purposes, two computing devices 101 are shown in FIG. 1. Fewer or more computing devices 101 might be used in other implementations of the described techniques. According to some configurations, the messaging service 110, the sharing service 115 and the computing devices 101 are interconnected through one or more local and/or wide area networks (not shown).

The functionality described herein may be provided by a service provider operated network-based distributed computing environment (which may be referred to herein as a "service provider network" 120). In some configurations, the messaging service 110 and/or the sharing service 115 may be implemented within the service provider network 120.

As described in more detail below, the service provider network 120 may include a collection of rapidly provisioned and, potentially, released computing resources. The computing resources may include a number of computing, networking and storage devices in communication with one another. In some configurations, the computing resources may correspond to physical computing devices. In other configurations, the computing resources may correspond to virtual machine instances implemented by one or more physical computing devices. In still other configurations, computing resources may correspond to both virtual machine instances and physical computing devices. The operator of the service provider network 120 may charge for the use of computing resources.

In some configurations, the messaging service 110 may be provided by one or more computing devices, such as server computing devices, or some other computing device or devices configured to perform the techniques described herein. For illustrative purposes, configurations of the messaging service 110 may include a server 181A storing a messaging manager 105A, a message database 106 and a directory 108A. As will be described in more detail below, the messaging manager 105A may access permission data stored in the directory 108A for controlling user access to messages and other data stored in the message database 106. The messaging manager 105A may be configured to manage the communication of messages 109 between one or more computing devices 101.

The sharing service 115 may be provided by one or more computing devices, such as server computing devices, or some other computing device or devices configured to perform the techniques described herein. For illustrative purposes, configurations of the sharing service 115 may include a server 181B storing a sharing manager 105B, a file data store 107 and a directory 108B. As will be described in more detail below, the sharing manager 105B may access permission data stored in the directory 108B for controlling user access to files and other data stored in the file data store 107. For illustrative purposes, the directory 108A of the messaging service 110 and the directory 108B of the sharing service 115 may be referred to herein collectively and generically as a "directory 108" or "directories 108.

The sharing manager 105B may also be configured to manage the communication of data associated with the files 113 between one or more computing devices 101. In addition, and as described in more detail below, the messaging service 110 and the sharing service 115 may coordinate through one or more communication interfaces to manage the communication of messages 109 and files 113 via a message client interface.

The computing devices 101 may each include memory 180 storing a file 113 and a messaging client 111. The computing devices 101 may also include a display interface 118 and an input device 119. The messaging client 111 may be configured to communicate with the messaging service 110 to receive, compose and send messages 109. In some examples, the messaging client 111 of each computing device 101 may be configured to instruct the sharing service 115 store one or more files, such as the file 113. The messaging client 111 may be in the form of a stand-alone application, or any other application or software module having features that interact with a user the messaging service 110 and the sharing service 115 via one or more devices, such as the input device 119 and the display interface 118. The input device 119 may be any device, such as a keyboard, and/or the display interface 118, which may include a touch-enabled screen configured to receive gestures from one or more users.

In some examples, the messaging service 110 and/or the messaging client 111 may cause the display of a message interface on the first computing device 101A. The message interface may include an editable text field and controls for associating a file (e.g. file 113 and/or a file already stored by the sharing service 115) with a message 109. In particular, a user may select one or more files and associate the selected files with the message 109. Upon receiving the selection of the one or more files, the first computing device 101A communicates data about the selected files to the sharing service 115.

In some examples, when the file 113 is not stored by the sharing service 115, the first computing device 101A may transmit the file 113 for storage in the file data store 107 associated with the sharing service 115. In other examples, when the file 113 is already stored by the sharing service 115, the first computing device 101A may transmit information associated with the selected files 113 to the sharing service 115. For instance, the first computing device 101A might receive and transmit sharing options 114 to the sharing service. As discussed briefly above, the sharing options 114 may relate to access settings, feedback settings and expiration settings that are associated with the sharing of the selected files 113 with one or more users.

In some configurations, the messaging service 110 and/or the messaging client 111 generate one or more hyperlinks ("links") 122 that can be utilized to access the selected files stored by the sharing service 115. The messaging service 110 and/or the messaging client 111 may integrate the generated link 122 into the message 109 without user interaction. The message 109 including the link 122 might be communicated from the first computing device 101A to the second computing device 101B. The message 109 and the link 122 may be displayed on the interface 118 of the second computing device 101B.

When authorized (e.g., according to the specified sharing options 114), a user of the second computing device 101B may select the link 122 included in the message 109 to initiate the communication of data associated with the file 113 from the sharing service 115 to the second computing device 101B. According to some configurations, the sharing service 115 exposes one or more network application programming interfaces ("APIs"), such as the API 112. The API 112 can be accessed by various devices in communication with the sharing service 115 to access the functionality for setting the sharing options 114 using the messaging client 111 as described herein. The API 112 may be configured to support various protocols for various devices.

The techniques described herein enable users to associate one or more selected files 113 with a message 109 that are to be shared with one or more other users from a single message client interface. By providing a message client interface with one or more controls that enable to a user to share a file 113 stored by a service, such as the sharing service 115, users can share files with recipients of the message 109 without the need to switch to another application interface.

As discussed above, a user may specify the users that can access one or more shared documents while composing an electronic message, such as the message 109. For example, a user may use the messaging client 111 to specify the files to be shared that are stored by the sharing service 115 as well as to set the permissions required to access the shared files, such as the file 113. In some configurations, the files 113 that are specified to be shared by the user while composing the message 109 are stored by the sharing service 115 that is separate from the messaging service 105. The sharing service 115 may provide access to files 113 stored by the sharing service, such as in the file data store 107, to users based on the access settings specified by the sharing options 114. For instance, the sharing service 115 may restrict access or allow access to the file 113 to a user based on the access settings (e.g., the permissions) associated with the file 113.

As discussed briefly above, the messaging client 111 might display an interface, such as a user interface ("UI") that may be utilized by the user composing the message 109 to set the sharing options 114. In other configurations, the messaging client might receive the sharing options 114 using some other mechanism. For example, the messaging client 111 might be configured to receive voice data that specifies the sharing options 114. According to some configurations, the sharing options 114 include access settings, feedback settings, and expiration settings. The access settings may be used to specify the users that may access the file 113 specified to be shared in the message. For example, the access settings might include an option to allow only specified recipients of the electronic message 109 to access the shared files 113 specified by the message 109 and accessible using the sharing service 115.

The access settings may include an option to allow anyone that has access to the electronic message to access the shared files stored by the sharing service. The access settings might also allow the user to specify the users, such as a group of users (e.g., the people of an organization), that can access the shared files 113 stored by the sharing service 115. Other access settings that specify the users that can access the shared files might also be included in the UI. For example, an access setting that allows the user to specify access settings for each shared file on a per file and per user basis.

The feedback settings associated with the file 113 may be used to specify whether feedback is desired for the shared file 113 as well as a time period within which the feedback is desired. The UI, such as the UI 500 illustrated in FIG. 5, might display one or more UI elements that may be used to specify the time the feedback is desired. In some examples, the user may set a feedback deadline setting that specifies a date and time the feedback is due. The expiration settings may be used to specify whether access to the shared files is to expire. For example, the UI might display one or more settings that indicate that no expiration is to be associated with the sharing of the files 113 or that sharing of the files 113 should expire at a specified time.

The sharing options specified by the user composing the message 109 may be communicated from the messaging client 111 to the sharing service 115. According to some configurations, the messaging client 111 utilizes one or more network APIs, such as the API 112 exposed by the sharing service 115 to communicate the sharing options 115 that include the access settings, the feedback settings, and the expiration settings to the sharing service 115. In some cases, the messaging client 111 might utilize the API 112 to transmit the sharing options 114 directly to the sharing service 115. In other cases, the messaging client 111 might utilize the API 112 to transmit the sharing options 114 to the messaging service 110 that transmits the sharing options 114 to the sharing service 115. The sharing service 115 may manage the sharing of the specified files 113 using the received sharing options.

In some configurations, the sharing options 114 may specify that the file 113 is to be shared with all of the recipients of the message 109. In this case, the sharing service 115 may set the permissions to access the file 113 such that each recipient identified by the message 109 may access the file 113. In other cases, the user composing the message 109 might specify other users that are allowed access to the file 113. In these cases, the sharing service 115 may set the permissions with the file 113 such that each user specified by the access settings in the sharing options 114 is allowed access to the file 113.

As also discussed above, the sharing options 114 may include feedback settings. The feedback settings may be used by the sharing service 115 to associate the time period within which feedback is requested with the file 113. In some examples, the sharing service 115 may be configured to provide one or more reminders to the authorized users, or recipients of the message 109, that feedback is requested and/or that the feedback is requested by a particular time.

In some examples, the expiration settings specified in the sharing options 114 may be used by the sharing service 115 to set the time the sharing of the file 113 is to expire. For instance, the sharing service 115 may set the user permissions used to access the file 113 to expire at the specified time. More details on setting the sharing options are provided below.

Figure 2A:
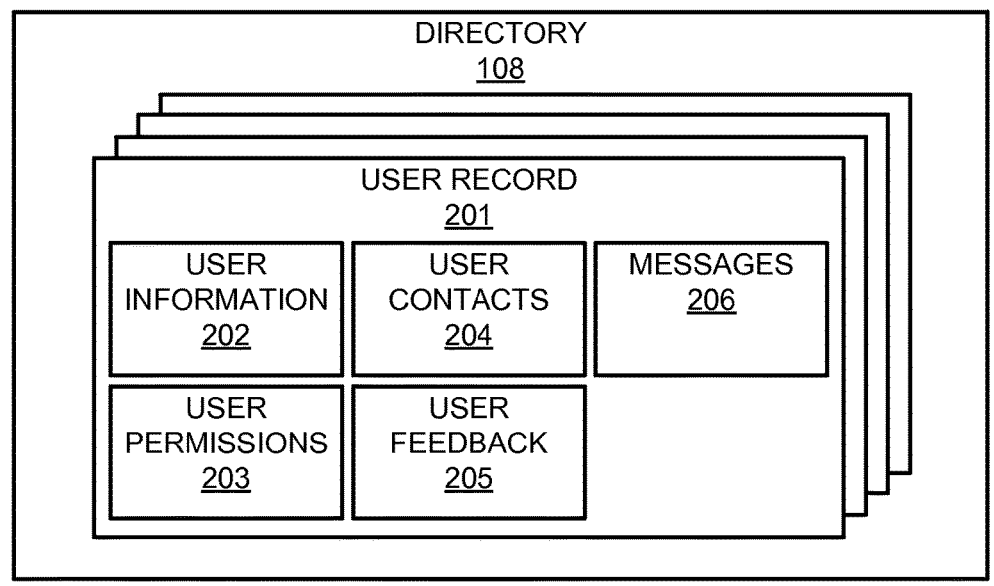
FIG. 2A is a block diagram depicting a directory.
Figure 2B:
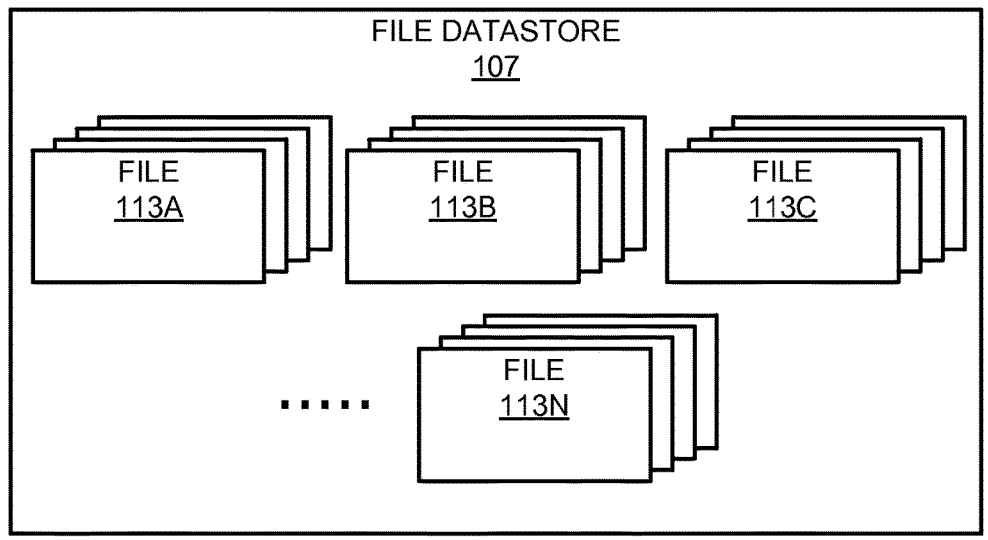
FIG. 2B is a block diagram depicting a file data store.

FIG. 2A is a block diagram depicting a directory 108 and FIG. 2B is a block diagram depicting the file data store 107 that might be utilized by the messaging service 110 and/or the sharing service 115. In some configurations, the directory 108 illustrated in FIG. 2A may include a number of records for defining access rights (e.g., as defined by the access settings specified in the sharing options 114) and permissions for users and/or identities accessing data stored by the sharing service 115 and possibly by the messaging service 110. As illustrated in FIG. 2A, an individual user record 201 may include the storage and/or association with different types of data, including, but not limited to user information 202, user permissions 203, user contacts 204, and user feedback 205. In some configurations, the user information 202 may store general identification information such as a user's name, email address, phone number and other contact information.

The user permissions 203 may contain one or more data structures for defining access rights to individual records, emails or files or other data. According to some examples, data defining access rights may be based on a per user and per record basis. Thus, individual files, directories, emails, feedback comments or other data may be controlled by the user permissions 203. The user contacts 204 may include a list of email addresses, phone numbers and identification information for other users. In some configurations, the user record 201 may include user feedback 205, which as will be described in more detail below, may include comments, notes and other data associated with files 113 stored in the file data store 107.

In some configurations, the directory 108 may include more or fewer types of data. In addition, for the sharing service 115, the directory 108 may contain a subset of the data types shown in the example of FIG. 2A. For instance, the directory 108B of the sharing service 115 may only include and/or utilize the user information 202 and user permissions 203.

The file data store 107 illustrated in FIG. 2B may include the storage of files 113A-113N, which are also referred to herein individually and generically as a "file 113" or "files 113." In some configurations, the file data store 107 may store different versions for each file 113A-113N, allowing users to select, edit, communicate and/or process newer or older versions of each file 113. In some configurations, among many other features, the file data store 107 may also store other types of data, such as the user feedback 205. In such configurations, the user feedback 205 may be stored in the files, or in other data fields.

Turning now to FIGS. 3-7, different examples of graphical user interfaces are illustrated as screen diagrams that display information relating to setting sharing options for files accessible through a sharing service from within a messaging client. The screen diagrams presented are for illustrative purposes only, and are not intended to be limiting. For example, other visual interface as well as non-visual interfaces (e.g., voice, touch) might be utilized to perform the functionality described herein.

Figure 3:
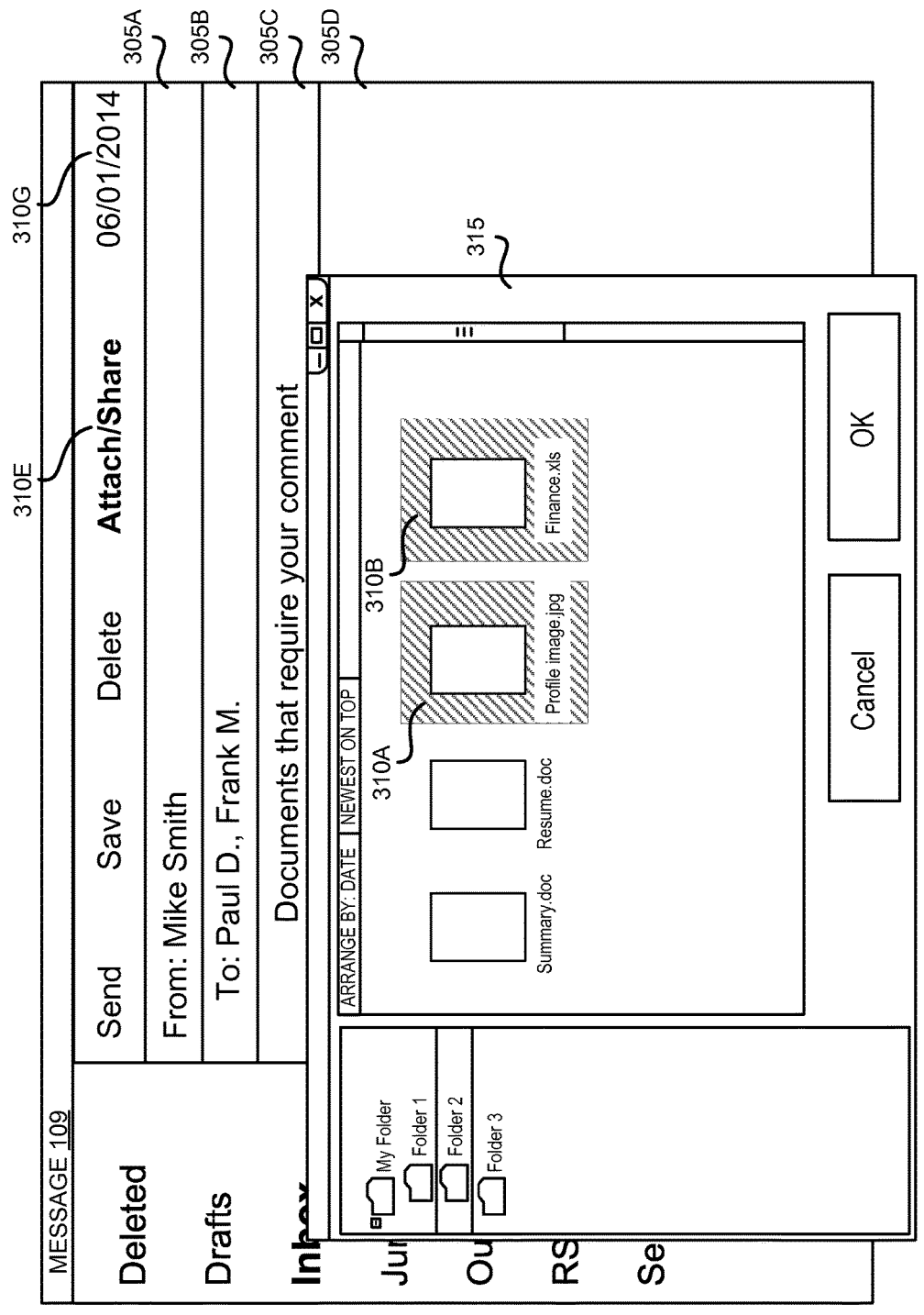
FIG. 3 is a screen diagram showing an illustrative graphical user interface that displays data relating to selecting one or more files to share while composing a message.

FIG. 3 is a screen diagram showing an illustrative graphical UI 300 that displays data relating to selecting one or more files to share while composing a message 109. The UI 300 may be generated by the messaging client 111, shown in FIG. 1, and presented on a computing device, such as the computing device 101A or 101B by an application, such as a web browser application.

As illustrated in FIG. 3, the UI 300 includes a display of the message 109 being composed. In the current example, the message 109 includes a "from" UI element 305A showing the sender of the message 109, a "recipient" UI element 305B for specifying the recipients of the message 109, a "subject" UI element 305C for specifying the subject of the message 109, message area UI element 305D for entering text of the message 109, and a "share" UI element 310E for specifying one or more files 113 to share.

A user may select the share UI element 310E to share one or more files 113. In the current example, the file selection UI element 315 is displayed in response to the user selecting the share UI element 310E. The files illustrated in the UI element 315 may be stored on a local data store or a network data store. For example, the files might be stored by the first computing device 101A, the second computing device 101B or stored by the sharing service 115.

As illustrated, the user has selected two files 113 for sharing. The first file 113 selected is the "profile image.jpg" file represented by file UI element 310A. The second file 113 selected is the "finance.xls" file represented by file UI element 310B. In other examples, different UI elements or mechanisms may be used to select the files to be shared. For example, the user might drag and drop a file to a location within the message 109.

After the user has selected the files 113 to be shared, the user may select the OK button. In response to selecting the OK button, the file selection UI element 315 may be closed and the message 109 displayed as illustrated in FIG. 4.

Figure 4:
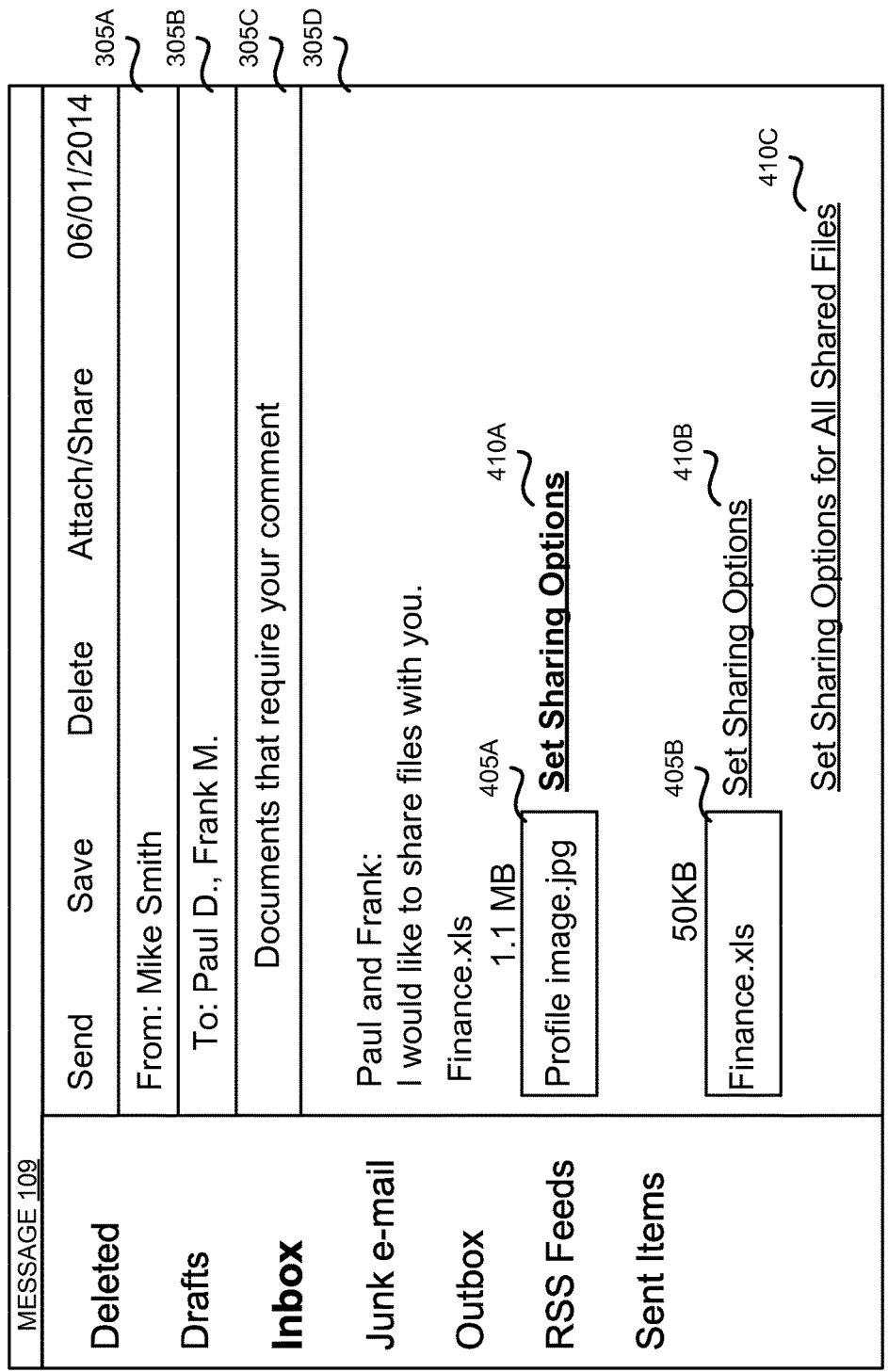
FIG. 4 is a screen diagram showing an illustrative graphical user interface that displays data relating to the message.

FIG. 4 is a screen diagram showing an illustrative graphical UI 400 that displays data relating to the message 109. The UI 400 may be generated by the messaging client 111, shown in FIG. 1, and presented on a computing device, such as the computing device 101A or 101B by an application, such as a web browser application.

The UI 400 illustrated in FIG. 4 is similar to the UI 300 illustrated in FIG. 3. In the current example, message area UI element 305D shows a shared file UI element 405A indicating that the "profile image.jpg" file 113 is selected for sharing and the shared file UI element 405b indicating that the "finance.xls" file 113 is selected for sharing. As discussed herein, the UI element 405-405B might be a link to the associated file. The message area UI element 305D also displays a set sharing options UI element 410A to set the sharing options for the "profile image.jpg" file 113 and an options UI element 410B to set the sharing options for the "finance.xls" file 113. In some examples, the message area UI element 305D also displays a set sharing options UI element 410C to set the sharing options for each of the shared files. In the current example, selecting the sharing options UI element 410C would configure the settings for the "profile image.jpg" file 113 and the "finance.xls" file 113. According to some configurations, a single UI element may be selected to set the sharing options. In the current example, the user has selected the set sharing options UI element 410A. In response to the selection, the UI 500 is displayed as illustrated in FIG. 5.

FIG. 5 is a screen diagram showing an illustrative graphical UI 500 that displays data relating to setting the sharing options for the message 109. The UI 500 may be generated by the messaging client 111, shown in FIG. 1, and presented on a computing device, such as the computing device 101A or 101B by an application, such as a web browser application.

In the current example, the UI 500 is an example of a sharing option interface that includes an access settings UI element 505A, a feedback settings UI element 505B, and an expiration settings UI element 505C. The sharing options illustrated in the UI 500 are intended for illustration purposes, and are not intended to be limiting. The UI 500 used to specify the sharing options may include more or fewer UI elements.

The access settings UI element 505A includes options to specify the users that may access the file specified to be shared in the message. As illustrated, the access settings UI element 505A includes an option to allow only specified recipients of the electronic message to access the shared files stored by the sharing service. The access settings UI element 505A also includes an option to allow anyone that has access to the electronic message to access the shared files stored by the sharing service and an option to specify the users, such as a group of users (e.g., the people of an organization), that can access the shared files stored by the sharing service. In the current example, the user has selected the option to allow only the recipients of the message to access the shared files 113. Other access settings that specify the users that can access the shared files might also be included in the UI. For example, an access setting that allows the user to specify access settings for each shared file on a per file and per user basis. According to some configurations, changes made to the access settings will be remembered by the messaging client 111 as default settings that may be used the next time the sharing options UI is displayed.

The feedback settings UI element 505B includes options to specify whether feedback is desired for a shared file as well as a time period within which the feedback is desired. According to some configurations, when no option is selected within the feedback settings UI element 505B, no feedback is requested for the files 113 specified to be shared. As illustrated, the feedback settings UI element 505B includes an option to specify that no deadline is requested and another option to specify a date and time the feedback is due. In the current example, the user has specified that feedback is due on Jun. 2, 2014, which is one day from when the message is being composed as can be seen by referring to date element 310G illustrated in FIG. 3. As discussed herein, the UI 500 might apply the specified settings to each of the files 113 being shared or to each individual file 113 being shared.

The expiration settings UI element 505C includes options to specify whether access to the shared files is to expire. As illustrated, the expiration settings UI element 505C includes an option to specify that sharing is not to expire and another option to specify that the sharing of the files 113 should expire at a specified time. In the current example, the user has specified that the sharing is to expire on Jun. 6, 2014, which is five days from the date the message is being composed. When the desired sharing options have been specified using the UI 500, the user may select the "OK" button, which may cause the UI 600 illustrated in FIG. 6 to be displayed.

Figure 6:
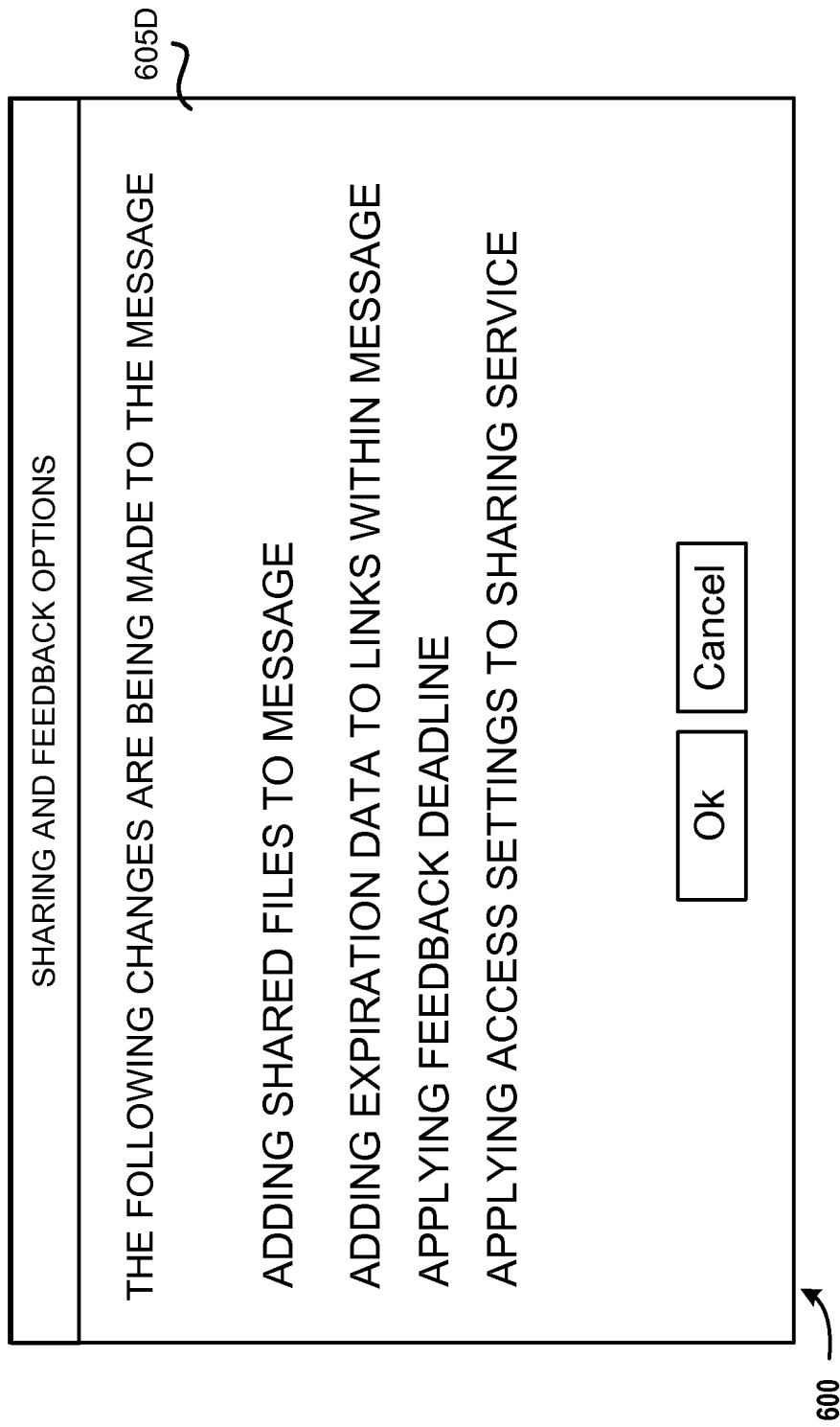
FIG. 6 is a screen diagram showing an illustrative graphical user interface that displays data showing changes being made to the message.

FIG. 6 is a screen diagram showing an illustrative graphical UI 600 that displays data showing changes being made to the message 109. The UI 600 may be generated by the messaging client 111, shown in FIG. 1, and presented on a computing device, such as the computing device 101A or 101B by an application, such as a web browser application.

In the current example, the UI 600 in display area UI element 605D indicates that the shared files are being associated with the message, the expiration data is being added, the feedback deadline is being applied and the access settings are being applied at the sharing service. In some configurations, the user might cancel these sharing options from being set by selecting the "cancel" button. In other configurations, the user might accept these sharing options by selecting the "ok" button. After the sharing options have been set, the UI 600 may be closed.

FIG. 7 is a screen diagram showing an illustrative graphical user interface 700 that is presented after the sharing options are specified for the message 109. The UI 700 may be generated by the messaging client 111, shown in FIG. 1, and presented on a computing device, such as the computing device 101A or 101B by an application, such as a web browser application.

The UI 700 illustrated in FIG. 7 is similar to the UI 400 illustrated in FIG. 4. In the current example, the UI 700 shows data indicating that the sharing options that were set for the message 109. As illustrated, the UI 700 includes a sharing indicator UI element 705A that shows the sharing options set for the "profile image.jpg" file 113 and the sharing indicator UI element 705A that shows the sharing options set for the "finance.xls" file 113. In the current example, the sharing options are different for each of the shared files 113. In some configurations, the user might change the sharing options after being specified by selecting one or more of the sharing settings displayed within the sharing indicator UI element.

Figure 8:
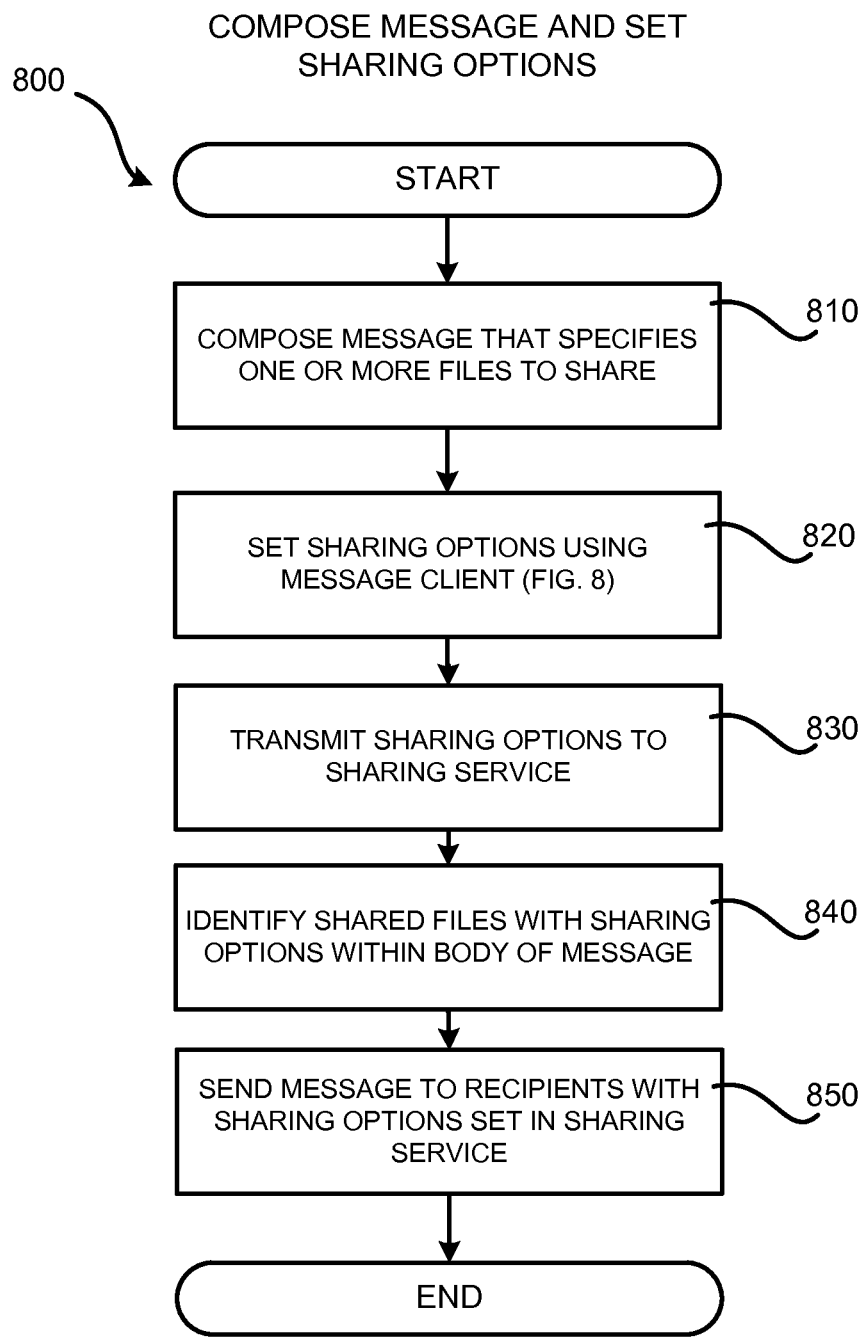
FIG. 8 is a flow diagram showing a routine illustrating aspects of a mechanism disclosed herein for setting sharing options for one or more files while composing an electronic message.
Figure 9:
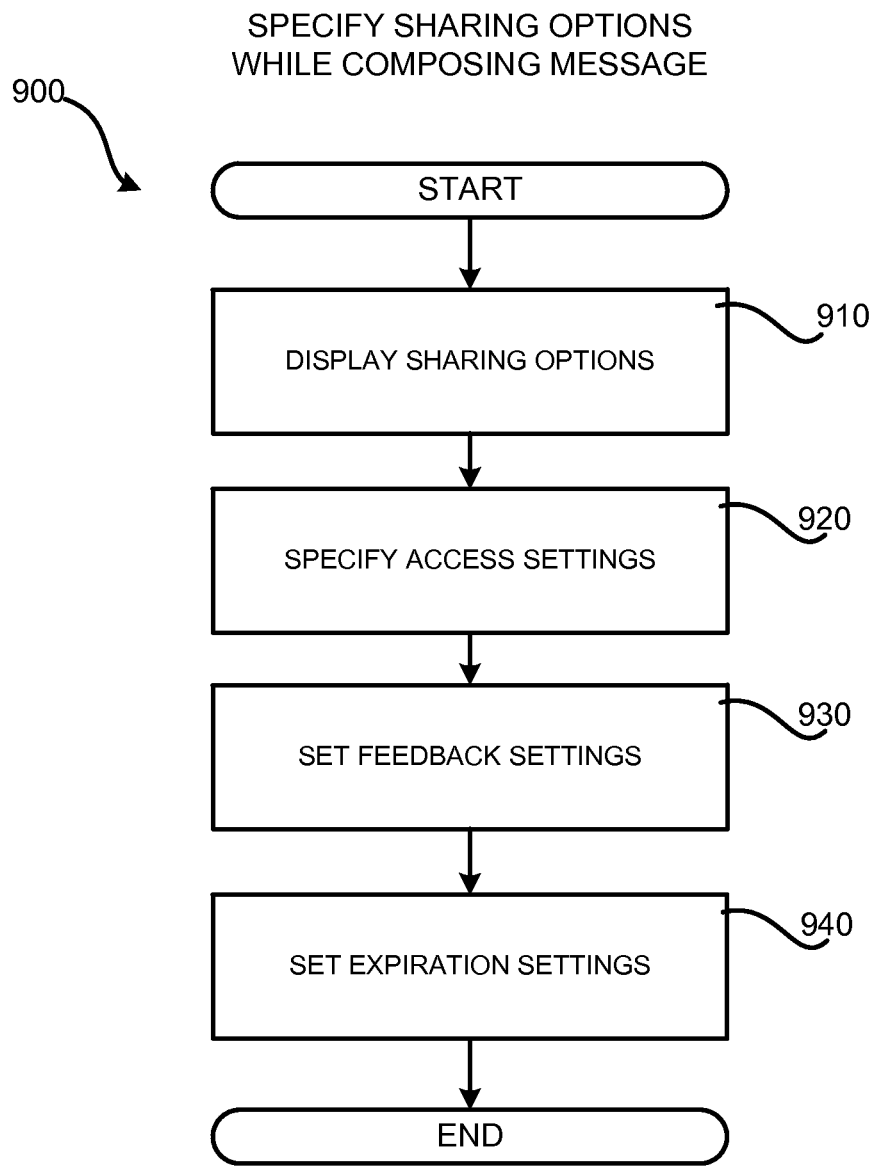
FIG. 9 is a flow diagram showing a routine illustrating aspects of a mechanism disclosed herein for setting sharing options using a messaging client.

FIGS. 8 and 9 are flow diagrams showing routines that illustrate aspects of setting sharing options for files to be shared using a messaging client, according to examples disclosed herein. It should be appreciated that the logical operations described herein with respect to FIGS. 8 and 9, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic and any combination thereof. It should also be appreciated that more or fewer operations may be performed than shown in the FIGS. and described herein. These operations may also be performed in parallel, or in a different order than those described herein.

FIG. 8 is a flow diagram showing a routine 800 illustrating aspects of a mechanism disclosed herein for setting sharing options for one or more files while composing an electronic message. The routine 800 may begin at operation 810, where an electronic message is composed that specifies one or more files to share. As discussed above, the electronic message might be composed using a messaging client 111 that is associated with the messaging service 110. In some configurations, the user selects one or more files to be shared by the sharing service 115 with one or more users.

From operation 810, the routine 800 may proceed to operation 820, where the sharing options for the files to be shared are set using the message client 111. As discussed above, the sharing options might include access settings, feedback settings, and expiration settings relating to the files to be shared.

From operation 820, the routine 800 may proceed to operation 830, where the sharing options are transmitted to the sharing service 115. As discussed above, the messaging client 111 might utilize the API 112 to transmit the settings for the sharing options directly to the sharing service 115. In other cases, the messaging client 111 might utilize the API 112 to transmit the settings to the messaging service 110 that may then transmit the settings to the sharing service 115. The sharing service 115 uses the received settings to configure the sharing settings for one or more of the files to be shared.

From operation 830, the routine 800 may proceed to operation 840, where the shared files 113 are identified in the body of the electronic message. For example, and as discussed above, the messaging client 111 might cause a link to be displayed within the body of the message 109 along with a display area indicating the different sharing options that have been set.

From operation 840, the routine 800 may proceed to operation 850, where the message 109 may be sent by the messaging service 110. For example, the messaging service 110 may send an email, a text message, an SMS, or some other type of electronic message. As discussed above, the sharing options 114 may be communicated to the sharing service 115 before the message is sent to the recipient(s). The routine 800 may then proceed to an end operation. Alternately, the routine 800 might proceed back to repeat some or all of the processing operations described above. For example, from operation 850, the routine 800 may proceed back to operation 810.

FIG. 9 is a flow diagram showing a routine 900 illustrating aspects of a mechanism disclosed herein for setting sharing options using a messaging client. The routine 900 may begin at operation 910, where the sharing options are displayed. As discussed above, the sharing options may be displayed by the messaging client 111 within a UI, such as the UI 500 illustrated in FIG. 5. As also discussed above, the sharing options might include UI elements that may be used to specify access settings, feedback settings, and expiration settings relating to the files to be shared.

From operation 910, the routine 900 may proceed to operation 920, where the access settings for one or more of the files 113 to be shared may be specified. As discussed above, a user might utilize one or more UI elements to specify the users that may access the file specified to be shared in the message. For example, a user might specify that only specified recipients of the electronic message are allowed to access the shared files stored by the sharing service. In other examples, the user might specify that anyone that has access to the electronic message is allowed to access the shared files stored by the sharing service. The user might also specify the users, such as a group of users (e.g., the people of an organization), that can access the shared files stored by the sharing service.

From operation 920, the routine 900 may proceed to operation 930, where feedback settings for one or more of the files 113 to be shared may be specified. As discussed above, the user might specify whether feedback is desired as well as a time period within which the feedback is desired. In some examples, the user may set a feedback deadline setting that specifies a date and time the feedback is due.

From operation 930, the routine 900 may proceed to operation 940, where expiration settings for one or more of the files 113 to be shared may be specified. As discussed above, the user may specify whether access to the shared files is to expire. For example, the user might configure the expiration settings to indicate that no expiration is to be associated with the sharing of the files or that sharing of the files should expire at a specified time. The routine 900 may then proceed to an end operation. Alternately, the routine 900 might proceed back to repeat some or all of the processing operations described above. For example, from operation 940, the routine 900 may proceed back to operation 910.

Figure 10:
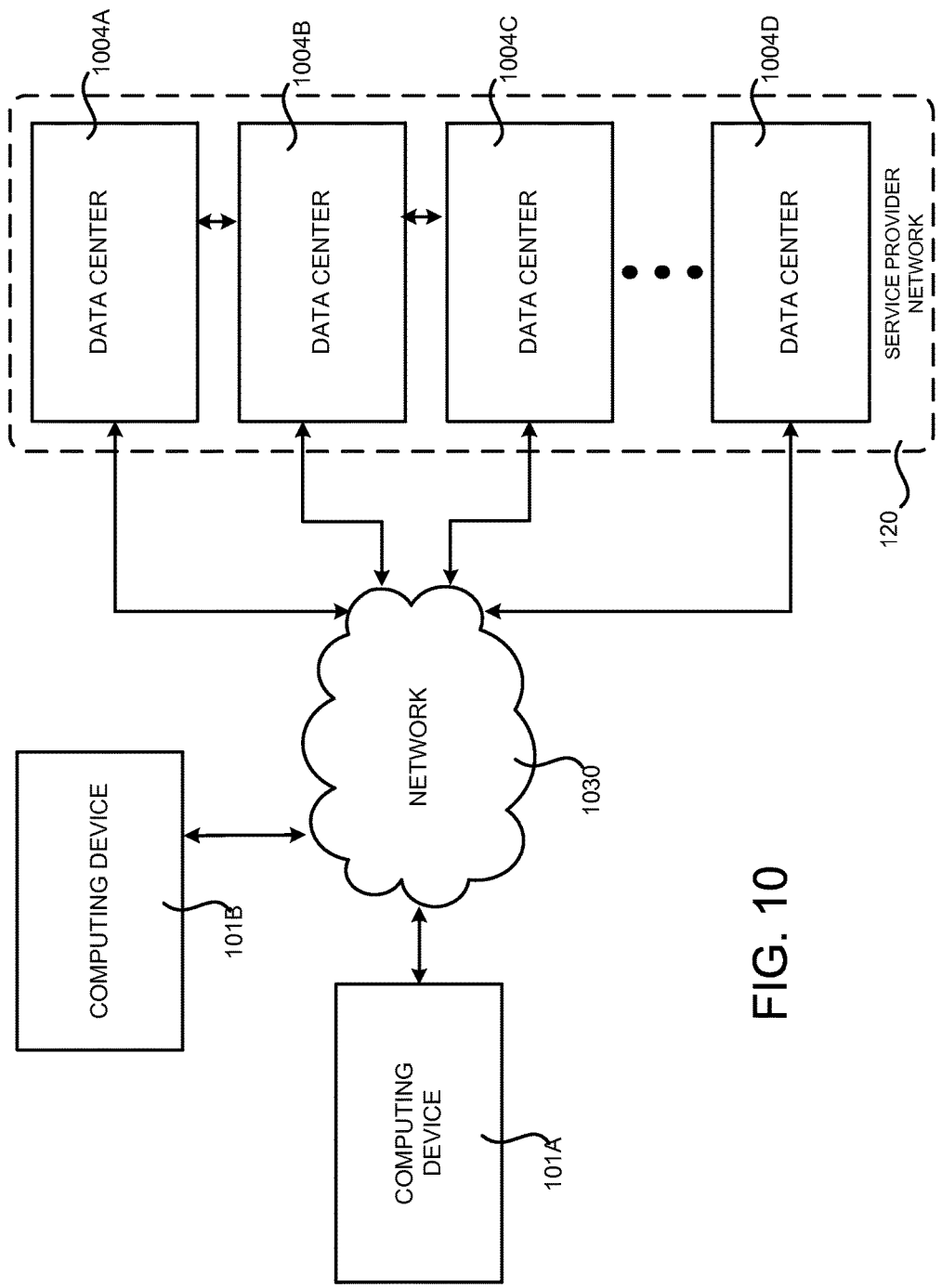
FIG. 10 is a system and network diagram that shows one illustrative operating environment for examples disclosed herein that includes a service provider network.

FIG. 10 and the following description are intended to provide a brief, general description of a suitable computing environment in which the embodiments described herein may be implemented. In particular, FIG. 10 is a system and network diagram that shows an illustrative operating environment that includes a service provider network 120. As discussed above, the service provider network 120 can provide virtual machine instances and computing resources on a permanent or an as-needed basis.

The computing resources provided by the service provider network 120 may include various types of resources, such as data processing resources, data storage resources, networking resources, data communication resources and the like. Each type of computing resource may be general-purpose or may be available in a number of specific configurations. For example, and as will be described in greater detail below, data processing resources may be available as virtual machine instances in a number of different configurations. The virtual machine instances may be configured to execute applications, including Web servers, application servers, media servers, database servers and other types of applications. Data storage resources may include file storage devices, block storage devices and the like. Each type or configuration of a virtual machine instance of a computing resource may be available in different sizes, such as large resources, consisting of many processors, large amounts of memory, and/or large storage capacity, and small resources consisting of fewer processors, smaller amounts of memory and/or smaller storage capacity.

The computing resources provided by the service provider network 120 are enabled in one implementation by one or more data centers 1004A-1004N (which may be referred to herein singularly as "a data center 1004" or collectively as "the data centers 1004"). The data centers 1004 are facilities utilized to house and operate computer systems and associated components. The data centers 1004 typically include redundant and backup power, communications, cooling and security systems. The data centers 1004 might also be located in geographically disparate locations. One illustrative configuration for a data center 1004 that implements some or all of the concepts and technologies disclosed herein for annotating resources in the service provider network 120 will be described below with regard to FIG. 11.

The users and customers of the service provider network 120 may access the computing resources provided by the data centers 1004 over a suitable data communications network, such as a Wide Area Network ("WAN"), as illustrated by the network 1030. Although a WAN might be used, it should be appreciated that a local-area network ("LAN"), the Internet, or any other networking topology known in the art that connects the data centers 1004 to the computing device 101A, and the computing device 101B may be utilized. It should also be appreciated that combinations of such networks might also be utilized.

Figure 11:
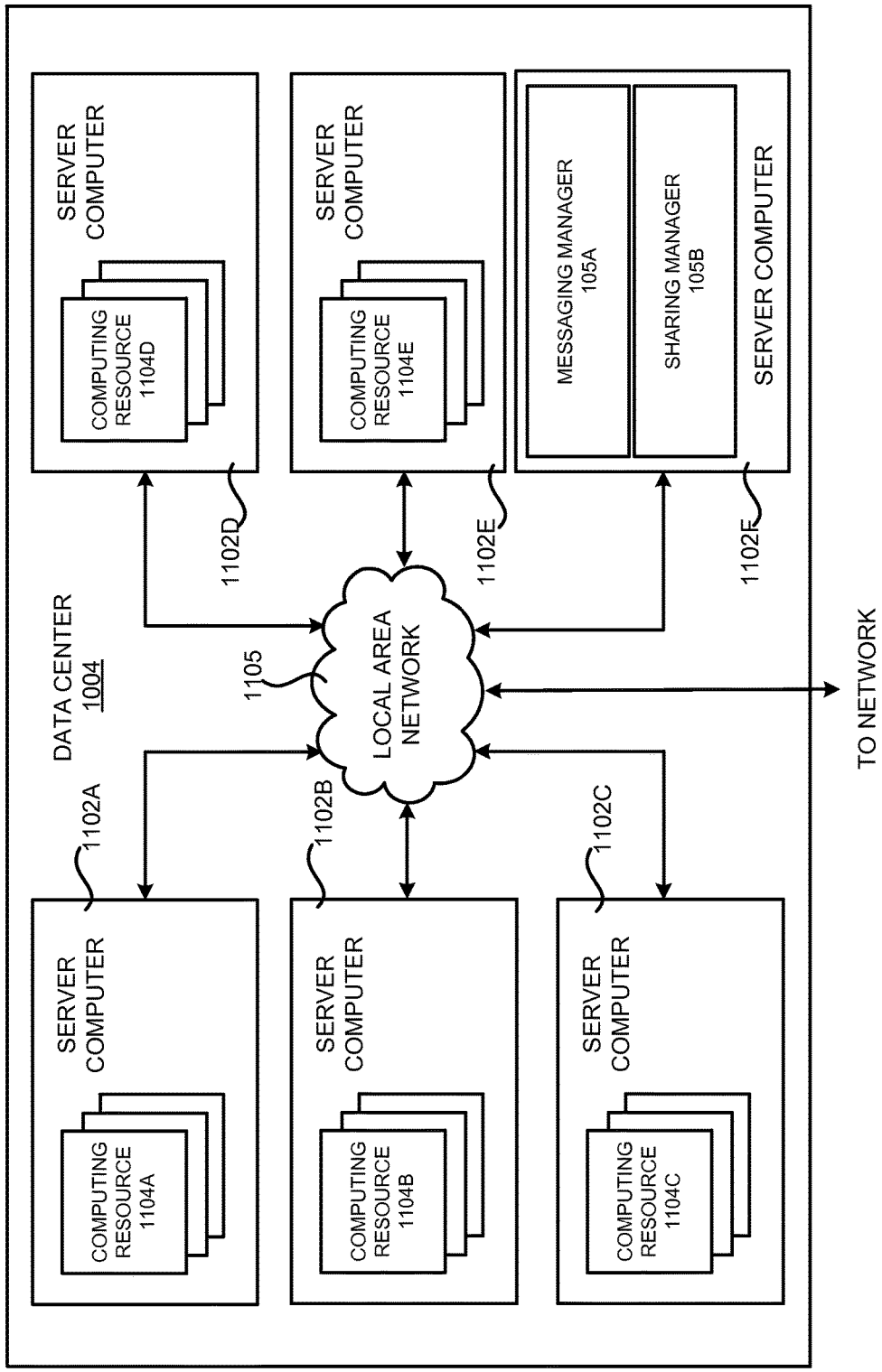
FIG. 11 is a computing system diagram that illustrates one configuration for a data center that implements aspects of the concepts and technologies disclosed herein for setting sharing options for files from within a messaging client.

FIG. 11 is a computing system diagram that illustrates one configuration for a data center 1004 that implements aspects of a service provider network 120, including some or all of the concepts and technologies disclosed herein for setting sharing options 114 for files to be shared using a messaging client 111. The example data center 1004 shown in FIG. 11 includes several server computers 1102A-1102F (which may be referred to herein singularly as "a server computer 1102" or in the plural as "the server computers 1102") for providing computing resources. The server computers 1102 may be standard tower or rack-mount server computers configured appropriately for providing the computing resources described herein. According to an embodiment, the server computers 1102 are configured to execute the software products as described above.

In one example, some of the computing resources 1104 are virtual machine instances. As known in the art, a virtual machine instance is an instance of a software implementation of a machine (i.e. a computer) that executes programs like a physical machine. Each of the server computers 1102 may be configured to execute an instance manager (not shown) capable of instantiating and managing computing resources and instances of computing resources. In the case of virtual machine instances, for example, the instance manager might be a hypervisor or another type of program configured to enable the execution of multiple virtual machine instances on a single server computer 1102, for example.

It should be appreciated that although the embodiments disclosed herein are described primarily in the context of virtual machine instances, other types computing resources can be utilized with the concepts and technologies disclosed herein. For instance, the technologies disclosed herein might be utilized with hardware resources, data storage resources, data communications resources, networking resources, database resources and with other types of computing resources.

The data center 1004 shown in FIG. 11 also includes a server computer 1102F reserved for executing software components for managing the operation of the data center 1004, server computers 1102, virtual machine instances, and other resources within the service provider network 120. The server computer 1102F might also execute the messaging manager 105A and/or the sharing manager 105B. Details regarding the operation of each of these components has been provided above. In this regard, it should be appreciated that while these components are illustrated as executing within the service provider network 120, computing systems that are external to the service provider network 120 might also be utilized to execute some or all of these components. Other configurations might also be utilized.

In the example data center 1004 shown in FIG. 11, an appropriate local area network ("LAN") 1105 is utilized to interconnect the server computers 1102A-1102E and the server computer 1102F. The LAN 1105 is also connected to the network 1030 illustrated in FIG. 10. It should be appreciated that the configuration and network topology illustrated in FIGS. 10 and 11 has been greatly simplified and that many more computing systems, networks and networking devices may be utilized to interconnect the various computing systems disclosed herein. Appropriate load balancing devices or software modules might also be utilized for balancing a load between each of the data centers 1004A-1004N, between each of the server computers 1102A-1102F in each data center 1004 and between virtual machine instances and other types of computing resources provided by the service provider network 120.

It should be appreciated that the data center 1004 described in FIG. 11 is merely illustrative and that other implementations might also be utilized. Additionally, it should be appreciated that the functionality provided by these components might be implemented in software, hardware, or a combination of software and hardware. Other implementations should be apparent to those skilled in the art.

Figure 12:
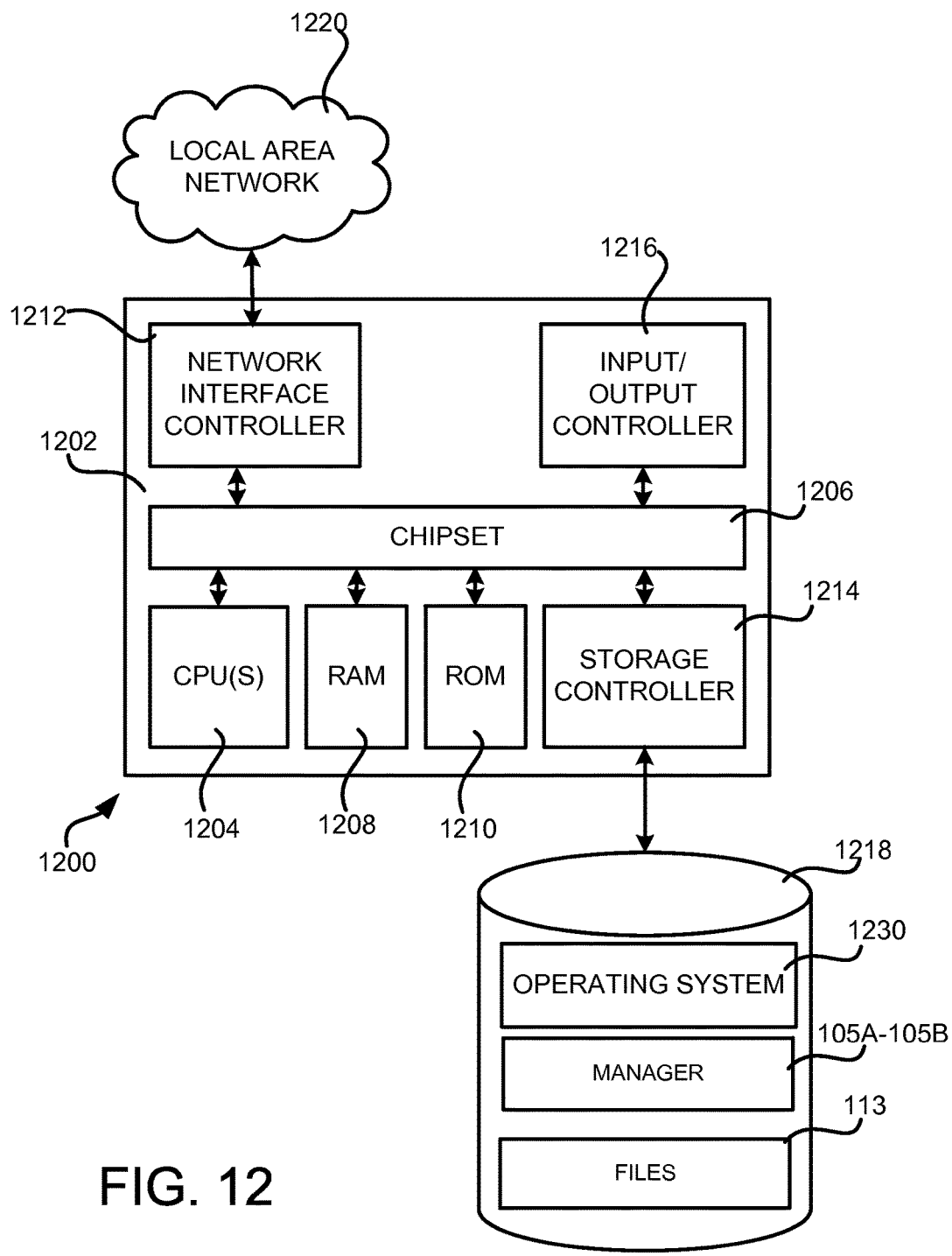
FIG. 12 is a computer architecture diagram showing an illustrative computer hardware architecture for implementing a computing device that might be utilized to implement aspects of the various embodiments presented herein.

FIG. 12 shows an example computer architecture for a computer 1200 capable of executing program components for setting sharing options for files to be shared using a messaging client 111 in the manner described above. The computer architecture shown in FIG. 12 illustrates a conventional server computer, workstation, desktop computer, laptop, tablet, network appliance, personal digital assistant ("PDA"), e-reader, digital cellular phone, or other computing device, and may be utilized to execute any of the software components presented herein. For example, the computer architecture shown in FIG. 12 may be utilized to execute software components for performing operations as described above. The computer architecture shown in FIG. 12 might also be utilized to implement a computing device 101A or 101B or any other of the computing systems described herein.

The computer 1200 includes a baseboard 1202, or "motherboard," which is a printed circuit board to which a multitude of components or devices may be connected by way of a system bus or other electrical communication paths. In one illustrative embodiment, one or more central processing units ("CPUs") 1204 operate in conjunction with a chipset 1206. The CPUs 1204 may be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements may generally include electronic circuits that maintain one of two binary states, such as flip-flops and electronic circuits that provide an output state based on the logical combination of the states of one or more other switching elements, such as logic gates. These basic switching elements may be combined to create more complex logic circuits, including registers, adders-subtractors, arithmetic logic units, floating-point units and the like.

The chipset 1206 provides an interface between the CPUs 1204 and the remainder of the components and devices on the baseboard 1202. The chipset 1206 may provide an interface to a RAM 1208, used as the main memory in the computer 1200. The chipset 1206 may further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM may also store other software components necessary for the operation of the computer 1200 in accordance with the embodiments described herein.

The computer 1200 may operate in a networked environment using logical connections to remote computing devices and computer systems through a network, such as the local area network 1220. The chipset 1206 may include functionality for providing network connectivity through a network interface controller (NIC) 1212, such as a gigabit Ethernet adapter. The NIC 1212 is capable of connecting the computer 1200 to other computing devices over the local area network 1220. It should be appreciated that multiple NICs 1212 may be present in the computer 1200, connecting the computer to other types of networks and remote computer systems.

The computer 1200 may be connected to a mass storage device 1218 that provides non-volatile storage for the computer. The mass storage device 1218 may store system programs, application programs, other program modules and data, which have been described in greater detail herein. The mass storage device 1218 may be connected to the computer 1200 through a storage controller 1214 connected to the chipset 1206. The mass storage device 1218 may consist of one or more physical storage units. The storage controller 1214 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1200 may store data on the mass storage device 1218 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1218 is characterized as primary or secondary storage and the like.

For example, the computer 1200 may store information to the mass storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 may further read information from the mass storage device 1218 by detecting the physical states or characteristics of one or more particular locations within the physical storage units.

In addition to the mass storage device 1218 described above, the computer 1200 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1200.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1218 may store an operating system 1230 utilized to control the operation of the computer 1200. According to one example, the operating system comprises the LINUX operating system. According to another example, the operating system comprises the WINDOWS® SERVER operating system from MICROSOFT Corporation. According to further examples, the operating system may comprise the UNIX operating system. It should be appreciated that other operating systems may also be utilized. The mass storage device 1218 may store other system or application programs and data utilized by the computer 1200, such as components that include the managers 105A-105B, the files 113, and/or any of the other software components and data described above. The mass storage device 1218 might also store other programs and data not specifically identified herein.

In one example, the mass storage device 1218 or other computer-readable storage media is encoded with computer-executable instructions which, when loaded into the computer 1200, transform the computer from a general-purpose computing system into a special-purpose computer capable of implementing the examples described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various routines described above with regard to FIGS. 8-9. The computer 1200 might also include computer-readable storage media for performing any of the other computer-implemented operations described herein.

The computer 1200 may also include one or more input/output controllers 1216 for receiving and processing input from a number of input devices, such as a keyboard, a mouse, a touchpad, a touch screen, an electronic stylus, or other type of input device. Similarly, the input/output controller 1216 may provide output to a display, such as a computer monitor, a flat-panel display, a digital projector, a printer, a plotter, or other type of output device. It will be appreciated that the computer 1200 may not include all of the components shown in FIG. 12, may include other components that are not explicitly shown in FIG. 12, or may utilize an architecture completely different than that shown in FIG. 12.

Based on the foregoing, it should be appreciated that technologies for setting sharing options for files using a messaging client have been presented herein. Moreover, although the subject matter presented herein has been described in language specific to computer structural features, methodological acts and computer readable media, it is to be understood that the invention defined in the appended claims is not necessarily limited to the specific features, acts, or media described herein. Rather, the specific features, acts and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to:
   cause a display of a message interface associated with a message client of a first computing device, the message interface used to compose an electronic message that is to be delivered to a recipient that is using one or more second computing devices, the message client associated with a messaging service;
   receive a selection of a file to be shared and accessible by a sharing service that is in communication with the first computing device and the one or more second computing devices, wherein the sharing service is coupled to the messaging service and the one or more second computing devices via a network;
   cause a display of a sharing option interface within the message client, the sharing option interface used to specify sharing options relating to the file, the sharing options including access settings that are used to specify one or more users that are allowed to access the file using the sharing service, feedback settings used to specify one or more requirements on feedback associated with the file to be received from the recipient, and expiration settings used to specify a time when sharing of the file will expire;
   receive sharing options from the sharing option interface;
   cause a display of an options summary interface within the message client, the options summary interface indicating changes being made by the sharing options for the file;
   receive acceptance of the changes from the options summary interface;
   cause the display of the message interface to be updated to reflect the sharing options for the file;
   communicate the sharing options from the message client to the sharing service; and
   cause the electronic message to be sent to the recipient via the messaging service, the electronic message including a hyperlink to the file shared by the sharing service and an indication of the access settings, the feedback settings, and the expiration settings for the file.

2. The non-transitory computer-readable storage medium of claim 1, wherein the sharing option interface includes a first option to allow only the recipient to access the file and a second option to allow anyone receiving the electronic message to access the file using the sharing service.

3. The non-transitory computer-readable storage medium of claim 1, wherein the feedback options include a feedback deadline option that is used to specify a time within which feedback is requested.

4. The non-transitory computer-readable storage medium of claim 1, wherein communicate the sharing options from the message client to the sharing service comprises the message client utilizing an application programming interface to communicate the sharing options to the sharing service.

5. An apparatus, comprising:
   at least one processor; and
   a non-transitory computer-readable storage medium having computer-executable instructions stored thereon which, when executed on the at least one processor, cause the apparatus to
   display a message interface, the message interface used to compose an email message, the message interface associated with a messaging service configured to send the email message to a recipient that is using one or more second computing devices,
   identify a file to be shared by a sharing service through the message interface, wherein the sharing service is coupled to the messaging service and the one or more second computing devices via a network,
   display a sharing option interface within the message client indicating one or more sharing options associated with the file, the one or more sharing options including access settings that specify one or more users authorized to access the file from the sharing service, feedback settings that specify one or more requirements on feedback associated with the file to be received from the recipient, and expiration settings used to specify a time when sharing of the file will expire,
   receive one or more sharing options associated with the sharing of the file by the sharing service,
   cause a display of an options summary interface within the message client, the options summary interface indicating changes being made by the one or more sharing options for the file,
   receive acceptance of the changes from the options summary interface,
   cause the display of the message interface to be updated to reflect the one or more sharing options for the file,
   communicate the one or more sharing options to the sharing service, the sharing service using the one or more sharing options to manage the sharing of the file, and
   cause the electronic message to be sent to the recipient via the messaging service, the electronic message including a hyperlink to the file shared by the sharing service and an indication of the access settings, the feedback settings, and the expiration settings for the file.

6. The apparatus of claim 5, wherein the sharing option interface includes one or more of a first option to allow only recipients of the email message to access the file stored by the sharing service, a second option to allow anyone that has access to the email message to access the file stored by the sharing service, or a third option that allows a specified group of users to access the file stored by the sharing service.

7. The apparatus of claim 5, wherein the feedback settings specify that feedback is due by a specified time.

8. The apparatus of claim 5, wherein communicate the sharing options from the message client to the sharing service comprises transmitting the access settings, feedback settings and expiration settings to the sharing service using an application programming interface.

9. The apparatus of claim 5, wherein the instructions further cause the apparatus to update a default access setting in response to receiving a change to the access setting using the message interface.

10. The apparatus of claim 5, wherein identify the file to be shared by the sharing service comprises receiving a selection of the file stored by the sharing service through the message interface.

11. A computer-implemented method, comprising:
causing display of a user interface of a first computing device, associated with a messaging service, for composing an electronic message;
receiving through the user interface an identification of a file to be shared with one or more second computing devices by a sharing service that is in communication with the first computing device and the one or more second computing devices, wherein the sharing service is coupled to the messaging service via a network;
displaying a sharing option interface within the message client indicating sharing options associated with the file, the one or more sharing options including access settings that specify one or more users authorized to access the file from the sharing service, feedback settings that specify one or more requirements on feedback associated with the file to be received from the recipient, and expiration settings used to specify a time when sharing of the file will expire;
receiving one or more sharing options associated with the sharing of the file by way of the user interface;
causing a display of an options summary interface within the message client, the options summary interface indicating changes being made by the one or more sharing options for the file;
receiving acceptance of the changes from the options summary interface;
causing the display of the message interface to be updated to reflect the one or more sharing options for the file;
communicating the one or more sharing options to the sharing service, the sharing service configured to use the one or more sharing options to manage the sharing of the file; and
causing the electronic message to be sent to the recipient via the messaging service, the electronic message including a hyperlink to the file shared by the sharing service and an indication of the access settings, the feedback settings, and the expiration settings for the file.

12. The computer-implemented method of claim 11, wherein receiving the one or more sharing options comprises receiving an indication that only specified recipients of the electronic message are authorized to access the file stored by the sharing service.

13. The computer-implemented method of claim 11, wherein receiving the one or more sharing options comprises receiving one or more of the feedback settings that specifies that feedback is due by a specified time.

* * * * *